United States Patent
Camiel

(10) Patent No.: US 7,886,363 B2
(45) Date of Patent: Feb. 8, 2011

(54) SYSTEM AND METHOD FOR VIRTUAL MEMORY AND SECURING MEMORY IN PROGRAMMING LANGUAGES

(76) Inventor: Noam Camiel, 47 Bilu St. Apt. 4, Tel-Aviv (IL) 64256

( * ) Notice: Subject to any disclaimer, the term of this patent is extended or adjusted under 35 U.S.C. 154(b) by 795 days.

(21) Appl. No.: 11/750,331

(22) Filed: May 17, 2007

(65) Prior Publication Data

US 2007/0277160 A1     Nov. 29, 2007

Related U.S. Application Data

(60) Provisional application No. 60/802,815, filed on May 24, 2006.

(51) Int. Cl.
*H04N 7/16*     (2006.01)

(52) U.S. Cl. ......................................... 726/27; 711/165
(58) Field of Classification Search ....................... None
See application file for complete search history.

(56) References Cited

U.S. PATENT DOCUMENTS

| 2005/0177822 | A1* | 8/2005 | Kuch et al. | 717/155 |
| 2006/0004984 | A1* | 1/2006 | Morris et al. | 711/203 |
| 2006/0259743 | A1* | 11/2006 | Suzuoki | 712/220 |

* cited by examiner

Primary Examiner—Brandon S Hoffman

(57) ABSTRACT

A method and system is introduced for implementing a virtual memory mechanism that works internally to computer languages that prevent direct memory access. Virtual memory mechanism is implemented in a manner that is independent of executing environment. Virtual memory mechanism may include security features preventing program code and execution environment from being altered, viewed or copied.

20 Claims, 8 Drawing Sheets

| 252 Page 1 memory location | 260 Virtual page address currently mapped to page 1 |
|---|---|
| 254 Page 2 memory location | 262 Virtual page address currently mapped to page 2 |
| o<br>o<br>o | o<br>o<br>o |
| 256 Page k memory location | 264 Virtual page address currently mapped to page k |

SYSTEM AND METHOD FOR VIRTUAL MEMORY AND SECURING MEMORY IN PROGRAMMING LANGUAGES

CROSS-REFERENCE TO RELATED APPLICATIONS

This application claims the benefit of US Provisional Patent Ser. No. 60/802,815, filed May 24, 2006 by the present inventor.

FIELD OF INVENTION

This invention generally relates to memory management and securing memory in computer languages. More particularly this invention relates to implementing virtual memory and memory protection within computer languages.

BACKGROUND OF THE INVENTION

Digital devices become common, from very small devices such as smart cards to multimedia players, mobile phones and so on. These digital devices usually have limited available memory. On the other hand, these devices are expected to perform a growing amount of tasks as well as to be able to dynamically load new tasks.

One such example of these digital devices is a mobile phone executing games written in the Java programming language (java.sun.com). These mobile phones have a Java virtual machine installed and the phone is capable of downloading Java programs dynamically from the network. The Java programming language for devices is a special environment referred to as J2ME or Java Micro Edition. This environment is specifically tailored for mobile phones and other devices with limited amounts of memory. These amounts usually refer a minimum of 64K bytes to 128 Kbytes and more.

There are devices that have significantly less memory available than these type of devices. Devices such as smart cards and flash based memory devices such as memory cards and flash drives usually have much smaller amounts of dynamic memory available.

In such devices with insufficient RAM memory, virtual memory can be used to simulate a larger RAM capacity, through the use of secondary memory, for example magnetic media such as hard drive or flash media.

To handle virtual memory a processor capable of handling virtual memory is required, but on low-end processors in small, embedded devices this ability may not be available. In some cases, even if processors do have virtual memory capabilities, it may not be desirable to use them because other parts of the embedded device may be using the virtual memory capabilities, making it too difficult to manage virtual memory for Java on the embedded device.

Some devices have very limited RAM constraints. An environment made for such devices is the Java Card Technology http://java.sun.com/products/javacard/ that is much more limited than J2ME. This environment does not allow many of the features of J2ME and is very limited to small, dedicated applications.

Having a J2ME environment on limited devices may allow making use of these platforms for numerous dynamic applications, such as security applications, unalterable code, code hiding, algorithm hiding, DRM applications etc. Furthermore it can open device for external developers that can develop these applications. Such applications may be downloaded upon request.

There is thus a need for executing a J2ME environment on these limited devices, though the memory requirement of J2ME prevents using this environment on these devices.

There are hardware devices which make use of a CPU that includes internal RAM within the CPU. In addition to the CPU the hardware device may include external RAM outside of the CPU and/or non-volatile memory. Such a device along with a secure virtual memory mechanism of this invention may be utilized when there is a need to keep certain code running only within internal RAM of CPU. This requirement arises for several reasons, some of which are program protection from alteration and program copy protection. In cases where more memory is required than available RAM within CPU, external RAM and/or external non-volatile memory may be used only if data transferred to them is encrypted.

In some cases it is required that programs and files be sent securely to a hardware device and execute on that device in a manner as described where CPU makes use only of internal RAM.

There is thus a widely recognized need for running programs using a small amount of RAM and using additional external auxiliary memory, in environments such as J2ME.

SUMMARY OF THE INVENTION

According to one aspect of the present invention there is provided a method for implementing virtual memory mechanism internal to computer language execution environment for a computer language execution environment that prevents direct memory access, the method comprising:
  a. checking if requested data is in main memory or in auxiliary memory prior to accessing said requested data in a computer program,
  b. moving memory from said auxiliary memory to said main memory when said requested data is not in said main memory,
  c. moving memory from said main memory to said auxiliary memory when additional memory in said main memory is required.

According to a second aspect of the present invention there is provided a system for implementing virtual memory internal to computer language execution environment the system comprising:
  a. main memory allowing direct access to data;
  b. auxiliary memory allowing to copy data from and to said main memory;
  c. processing unit capable of executing a program in a computer language said computer language execution environment does not allow direct access to said main memory;
    whereby memory access to requested data in said program takes place indirectly by said computer language execution environment by initially checking if said requested data is in said main memory, said requested data located in said auxiliary memory is moved to said main memory, whereby virtual memory takes place internally in said programming language execution environment.

According to a third aspect of the present invention there is provided a method for protecting a computer program using computer language execution environment for a computer language execution environment that prevents direct memory access, the method comprising:
  a. checking if requested data is in main memory or in auxiliary memory prior to accessing said requested data in a computer program, b. moving memory from said auxiliary memory to said main memory when said requested data is not in said main memory, c. decrypting memory moved from said auxiliary memory to said main memory, d. encrypting memory to be moved from said main memory to said auxiliary memory when additional memory in said main memory is required.

e. moving encrypted memory from said main memory to said auxiliary memory.

whereby data of said computer program is encrypted outside said main memory increasing said computer program execution security.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

Figure 1A:
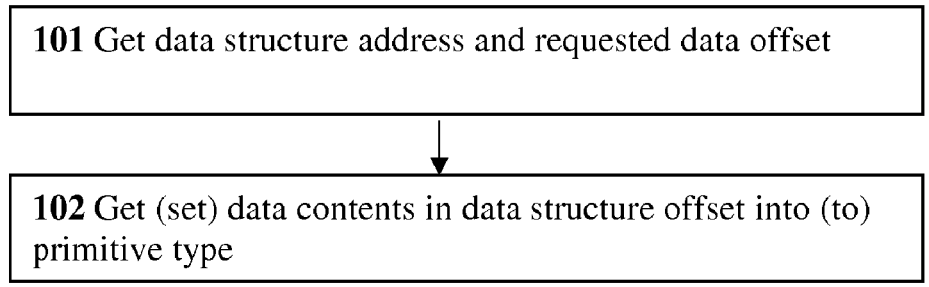
FIG. 1A is a schematic flowchart for manipulating primitive type data stored in a data structure in programming languages that allow direct memory access, in accordance with an embodiment of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

The preferred embodiments teach a digital device where a programming language virtual machine may be executed upon and implement a virtual memory mechanism internal to the programming language virtual machine. Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention includes several embodiments that can be realized using a digital device described herein. In this disclosure a digital device is described where a programming language virtual machine can be executed on. The programming language virtual machine implements a virtual memory mechanism internal to the programming language virtual machine. In this disclosure a method is described for a virtual machine to implement an independent virtual memory mechanism.

In the description herein below a virtual memory system is implemented internally and independently in languages that prevent direct access to memory such as Java. The example of Java will be discussed in more detail as an example but is not meant to be limiting.

In the description herein below a description of a virtual memory mechanism that is internal to the Java virtual machine (JVM) is described. This mechanism will be referred herein as Virtual Memory Mechanism. This mechanism does not rely on any external virtual memory capability external to the JVM, such as virtual memory handled by a processor. The virtual memory mechanism does require secondary memory, such as flash memory, magnetic media or external RAM, for handling its memory.

The internal virtual memory mechanism disclosed here includes the following memory virtualization mechanisms in order to perform its virtual memory tasks.

A) Memory for the entire required memory footprint that is virtually available to the JVM (Java Virtual Machine). This memory can be flash memory for example. This memory will be referred herein as auxiliary memory.

B) Random Access Memory or RAM used by JVM during VM operation. Virtual memory is mapped to RAM when accessed by VM. This memory will be referred to herein as RAM or main memory. Main memory can be significantly smaller than physical virtual memory.

C) A division of physical virtual memory into memory unit chunks that can fit into RAM. The physical virtual memory is divided into N unit chunks of memory. The RAM can fit M chunks of physical virtual memory at each single moment. These memory unit chunks will be referred herein as Pages.

D) A method of allocating memory from the physical virtual memory. This method will be referred herein as Virtual Memory Allocation.

E) A method of pointing to address within physical virtual memory as a memory address distinctive to real memory address. This pointer will be referred herein as Virtual Pointer. For example, a virtual memory allocation may return a virtual pointer, distinctively pointing to physical virtual memory allocation and not to a memory location in RAM.

F) A method of bringing a physical virtual memory page into main memory, returning the RAM address of the page. This method will be referred herein as Bring Page Into Main Memory. This method may work in the following manner: first check if there is a free place for requested page in main memory. If no place is available, take the least recently used chunk in main memory, copy it to its location in physical virtual memory. Now copy requested page data from physical virtual memory to main memory, returning the address of the page in RAM.

G) A method to lock and unlock a page in RAM. These will be referred herein as Lock Page and Unlock Page. These methods operate by flagging the method that brings a page into memory, to prevent from flushing locked pages from RAM even though they should be replaced due to the least recently used decision method.

H) In languages such as Java there is no direct access to memory. Instead, each memory access is first checked for validity and following that the actual memory address is accessed. This feature is used in this disclosure to implement the virtual memory mechanism. The JVM may implement this validity check feature by having a structure for each compound non-primitive type, such as arrays, instance objects etc, the structure holding information regarding that compound type.

Reference is now made to FIG. 1A, which is a schematic flowchart for manipulating primitive type data stored in a data structure in programming languages that allow direct memory access, in accordance with an embodiment of the present invention.

In step 101 data structure address is determined and requested data offset is received.

In step 102 memory contents in requested offset to data structure address is accessed, either to get data from or to write data to.

This series of steps displays how data is accessed in languages that allow direct memory access. In such languages, if the offset is not a legal value, for example larger than allocated data for data structure, the program will go to the illegal address, producing unpredictable results.

Figure 1B:
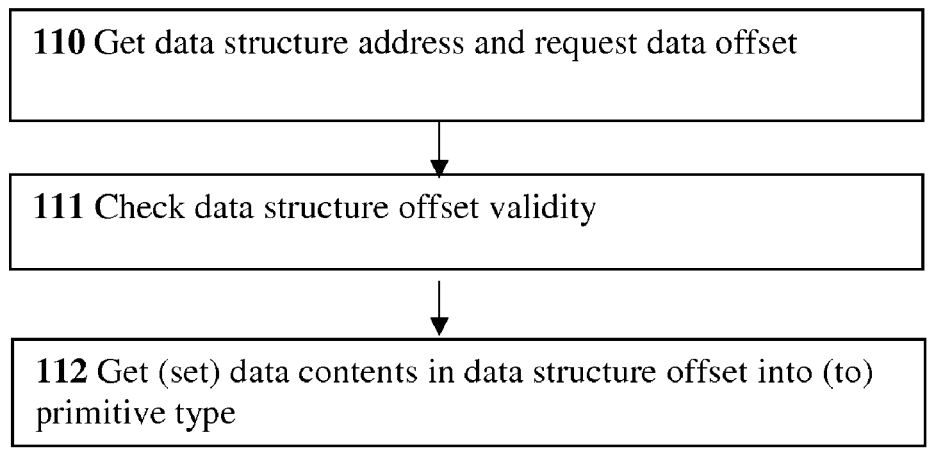
FIG. 1B is a schematic flowchart for manipulating primitive type data stored in a data structure in programming languages that prevent direct memory access, in accordance with an embodiment of the present invention.

Reference is now made to FIG. 1B, which is a schematic flowchart for manipulating primitive type data stored in a data structure in programming languages that prevent direct memory access, in accordance with an embodiment of the present invention.

In step 110 data structure address is determined and requested data offset is received.

In step 111 data structure offset is checked for validity prior to accessing data in data structure. In some embodiments this may be done by checking data structure headers in beginning of data structure data. In programming languages such as Java there is no direct access to memory, but each access is being checked for validity first.

In step 112 memory contents in requested offset to data structure address is accessed, either to get data from or to write data to.

This series of steps displays how data is accessed in languages that do not allow direct memory access, in contrast to languages that allow direct memory access. In case where offset is an illegal value, for example larger than allocated data for data structure, the program will not go to the illegal address, and may indicate an error.

Figure 1C:
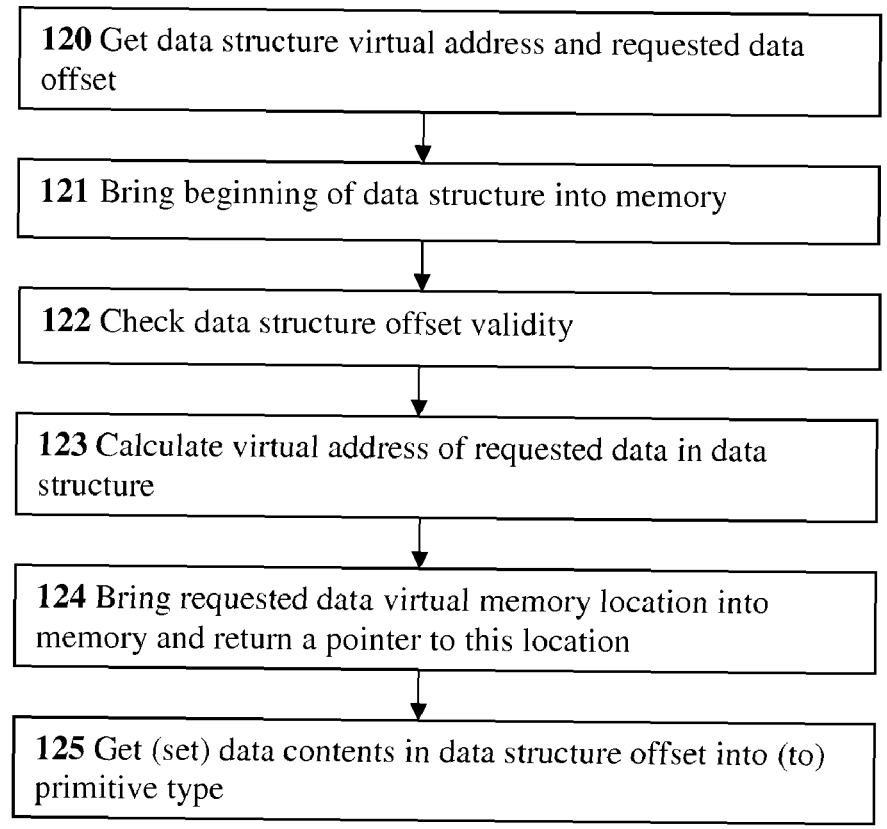
FIG. 1C is a schematic flowchart for manipulating primitive type data stored in a data structure in programming languages that prevent direct memory access and include virtual address mechanism, in accordance with an embodiment of the present invention.

Reference is now made to FIG. 1C, which is a schematic flowchart for manipulating primitive type data stored in a data structure in programming languages that prevent direct memory access and include virtual address mechanism, in accordance with an embodiment of the present invention.

In step 120 data structure virtual address is determined and requested data offset is received.

In step 121 beginning of data belonging to data structure is brought into memory (or is checked to already be in memory).

In step 122 data structure offset is checked for validity prior to accessing data in data structure. This is done in this embodiment by comparing the offset to data headers of data structure (now in memory) which may include information regarding length or other validation data regarding data structure.

In step 123 virtual address of requested data in data structure is calculated using data structure address and offset address.

In step 124 virtual memory location of requested data is brought into memory, if not already in memory and a pointer is returned to this location in memory.

In step 125 memory contents in requested offset to data structure address, as pointed by returned pointer in step 124, is accessed either to get data from or to write data to. Note that if the primitive type is of multiples of 32-bit words, this series of steps may be repeated for the next 32-bit primitive word. We assume that pages are aligned to 32-bit words and that 32-bit words are not cut.

This series of steps displays how the characteristics of computer languages that prevent direct access to memory may be used for implementing virtual memory mechanism internal to these computer languages.

The data structure memory may be first allocated through virtual memory allocation. Subsequent access to data structure data is made in an indirect manner to the data structure memory. This indirect access to memory allows inserting commands to fetch requested data from virtual memory to main memory, thereby adding virtual memory features to data structures in JVM.

In some embodiments where higher primitive type entries than 32 bit entries are used, this step is repeated so that each 32 bit portion is fetched separately. This is to ensure that the requested data is actually brought into main memory from auxiliary memory.

In the description herein below, the term "main memory" is referred to memory that is accessible to processing unit and may be used for computations. In the description herein below auxiliary memory is referred to as memory store that may be copied to main memory or that data from main memory may be copied to it. This memory is not used for computations (although it may also be RAM that may be used for computations).

Figures 2A, 2B:
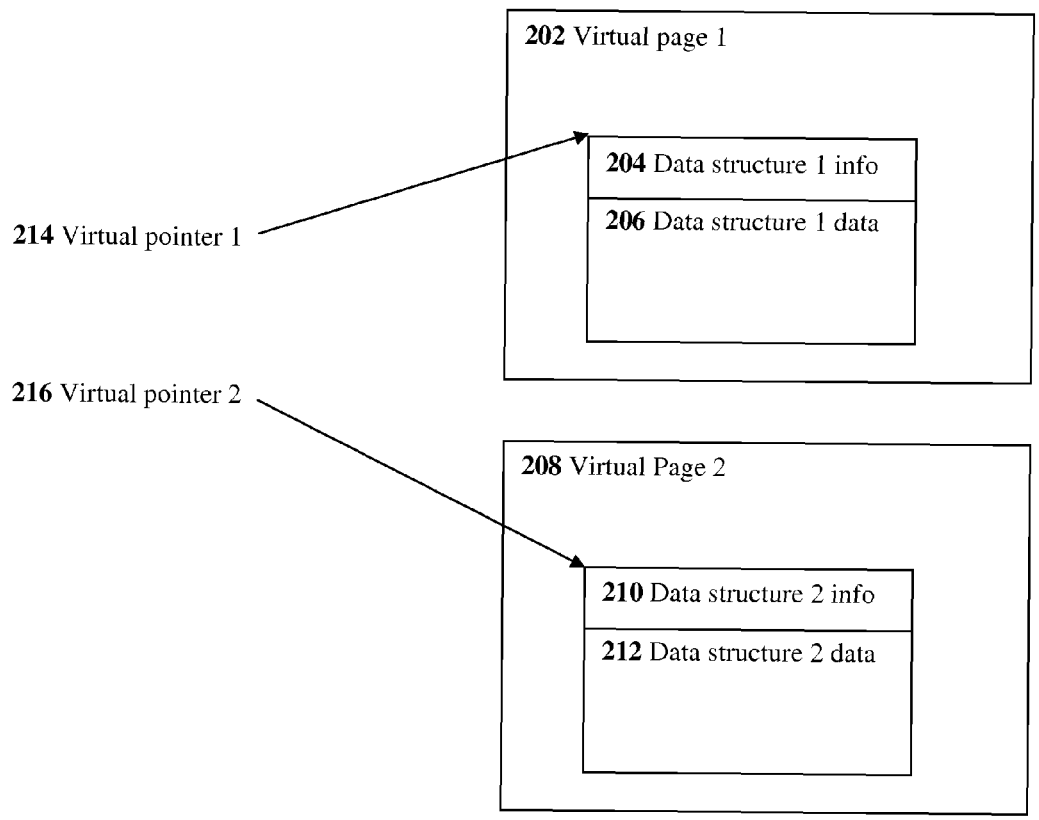
FIG. 2A is a block diagram illustration of data structures layout within virtual memory, in accordance with an embodiment of the present invention.
FIG. 2B is a block diagram illustration of a table for managing virtual pages in RAM, in accordance with an embodiment of the present invention.

Reference is now made to FIG. 2A, which is a block diagram illustration of data structures layout within virtual memory, in accordance with an embodiment of the present invention comprising virtual memory page 1 202, data structure 1 information header 204 located in virtual page 1 202 and data structure 1 data 206 located within virtual memory page 1 202. The diagram further comprises virtual memory page 2 208, data structure 2 information header 210 located in virtual page 2 208 and data structure 2 data 212 located within virtual memory page 2 208. The diagram further comprises a virtual pointer 1 214 holding the address to data structure 1 information header 204 and virtual pointer 2 216 holding the address to data structure 2 information header 210.

The block diagram illustrates a virtual memory layout for languages that employ an internal virtual memory mechanism. Such languages also do not allow direct access to memory for programs written in that language, such as block diagram IC explains. In accordance with an embodiment of the present invention, suppose data structure 1 204,206 is in main memory and data structure 2 210,212 is in auxiliary memory. When data structure 2 is needed in memory, it is fetched into main memory from auxiliary memory, perhaps moving structure 1 into auxiliary memory. All pointers to data structure 1 and 2 hold their virtual addresses, allowing making use of virtual memory for usage such as larger memory or for security of data and code.

Reference is now made to FIG. 2B, which is a block diagram illustration of a table for managing virtual pages in RAM, in accordance with an embodiment of the present invention comprising a data structure that holds current entries for virtual pages currently located in memory: page 1 memory location 252 holds virtual page 1 260 in memory, page 2 memory location 254 holds virtual page 2 262 in memory, etc until page k where page k memory location 256 holds virtual page k 264 in memory. Please note that an entry may be empty such that a page in memory is currently free.

Using such table in conjunction to virtual pages in FIG. 2A, virtual memory is managed internally to programming language that has access to auxiliary memory to store virtual memory, and access to main memory to bring virtual memory pages into main memory. The step of bringing pages from auxiliary memory to main memory is explained in FIG. 3.

Figure 3:
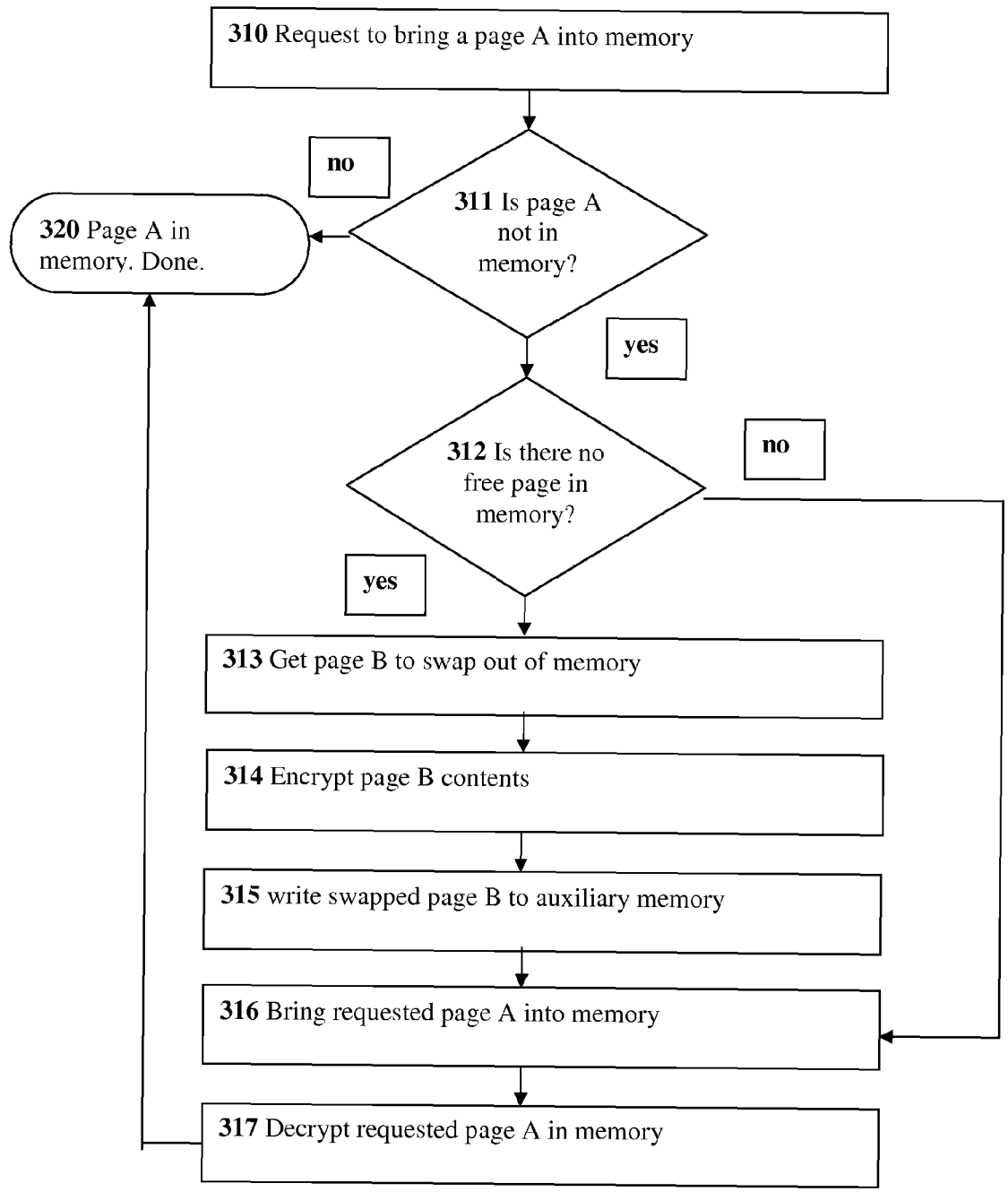
FIG. 3 is a schematic flowchart for bringing a virtual memory page into main memory, in accordance with an embodiment of the present invention.

Reference is now made to FIG. 3, which is a schematic flowchart for bringing a virtual memory page into main memory, in accordance with an embodiment of the present invention.

In step 310 virtual page A is requested to be brought into main memory (such as RAM memory or certain RAM memory).

In step 311 a check is made whether page A is in main memory already. This check may be done using table 2B listing all pages currently in main memory. If page A is found to be in main memory step 320 follows in which case the page is in memory and the flow ends successfully. Otherwise step 312 follows.

In step 312 a check is made to see if main memory is full. This check may be done using table 2B listing all pages currently in main memory and the page that they currently occupy, if any. If the main memory is not full step 316 follows. If main memory is full step 313 follows to make room for page A.

In step 313 page B is chosen as a page to swap out to make room for page A. This page may be chosen in various manners, such as round robin, least recently used etc.

In step 314 page B contents are encrypted prior to being written to auxiliary memory. This step adds security measures to the virtual memory mechanism.

In step 315 page B encrypted contents is written to auxiliary memory. Making room in main memory.

In step 316 requested page A is brought into main memory by copying it from auxiliary memory.

In step 317 page B is decrypted in main memory.

In step 320 page A is in memory and process is complete.

This series of steps displays how a virtual page may be brought into main memory for use in computation. This series of steps may take place when computer language handles its memory management and prevents programs from accessing memory directly, thereby allowing internal virtual memory such as explained above.

Encryption and decryption steps in steps 314 and 317 add security measures for program execution environment such that data in auxiliary memory cannot be altered, viewed or copied. In some embodiments steps 314 and 317 are not necessary and are skipped.

In some embodiments other virtual memory capabilities are used, such as marking pages as dirty and writing back to auxiliary memory only pages that have been written to, making steps 314 and 315 as unneeded in certain cases.

In some embodiments where encryption and decryption occurs, keys for encryption and decryption are held in memory inside processing unit and are inaccessible outside processing unit. In some embodiments, keys for memory encryption are generated during program execution and stored in temporary processing unit internal memory.

In some embodiments secret keys are used for receiving content from an external source in an encrypted form. In some embodiments received encrypted content is encrypted into a different encryption for accessing data in blocks. This step may be done with other secret keys, internally generated secret keys or the same keys as for receiving content.

In some embodiments data files are received from an external source. These files may be encrypted and may be handled in a similar way to encrypted code received from an external source.

In some embodiment the code of a computer program may be kept encrypted and be decrypted only in main memory. FIG. 3 may be used for computer program code as well as data, such that code is kept encrypted in auxiliary memory and as it is needed, code is read into main memory and decrypted there. Please note that since code usually does not change, the steps for writing memory back to auxiliary memory are not necessary to be carried out.

In some embodiments code from internet or other source is downloaded in an encrypted manner. Code may be kept encrypted and hidden from user even as it is being used, as described above. Please note that the encryption of the code may change internally to a format more easily used for random access, such as changing encryption from stream encryption to block encryption. In the manner described here it is possible to protect computer program code and environment from alteration, viewing and copying.

In some embodiments it is possible to lock and unlock a page in main memory. Locking a page is necessary when certain operations require several memory locations to be available. These will be referred herein as Lock Page and Unlock Page. These methods operate by flagging the method that brings a page into memory, to prevent from flushing locked pages from main memory even though they should be replaced due to the least recently used decision method or other decision method. In such a case of locked pages, other pages will be moved from main memory to auxiliary memory as required to free memory from main memory.

Figure 4A:
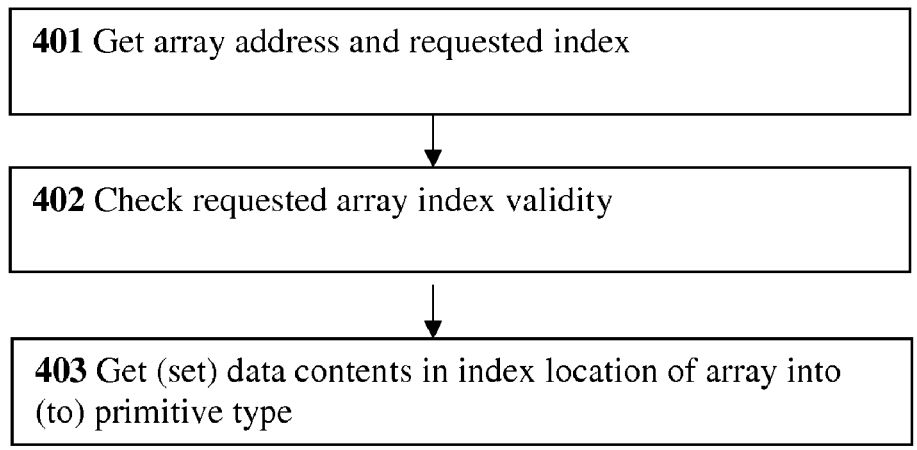
FIG. 4A is a schematic flowchart for manipulating primitive type data stored in an array in programming languages that prevent direct memory access, in accordance with an embodiment of the present invention.

Reference is now made to FIG. 4A, which is a schematic flowchart for manipulating primitive type data stored in an array in programming languages that prevent direct memory access, in accordance with an embodiment of the present invention.

In step 401 data array address is determined and requested data offset is received.

In step 402 array index is checked for validity prior to accessing data in array. In some embodiments this may be done by checking array headers at the beginning before array data.

In step 403 memory contents in requested index of array is accessed, either to get data from or to write data to.

This series of steps displays how data in an array is accessed in languages that do not allow direct memory access. In case where index is an illegal value, for example larger than allocated data for array, the program will prevent going to the illegal address of that illegal index, and may indicate an error.

Figure 4B:
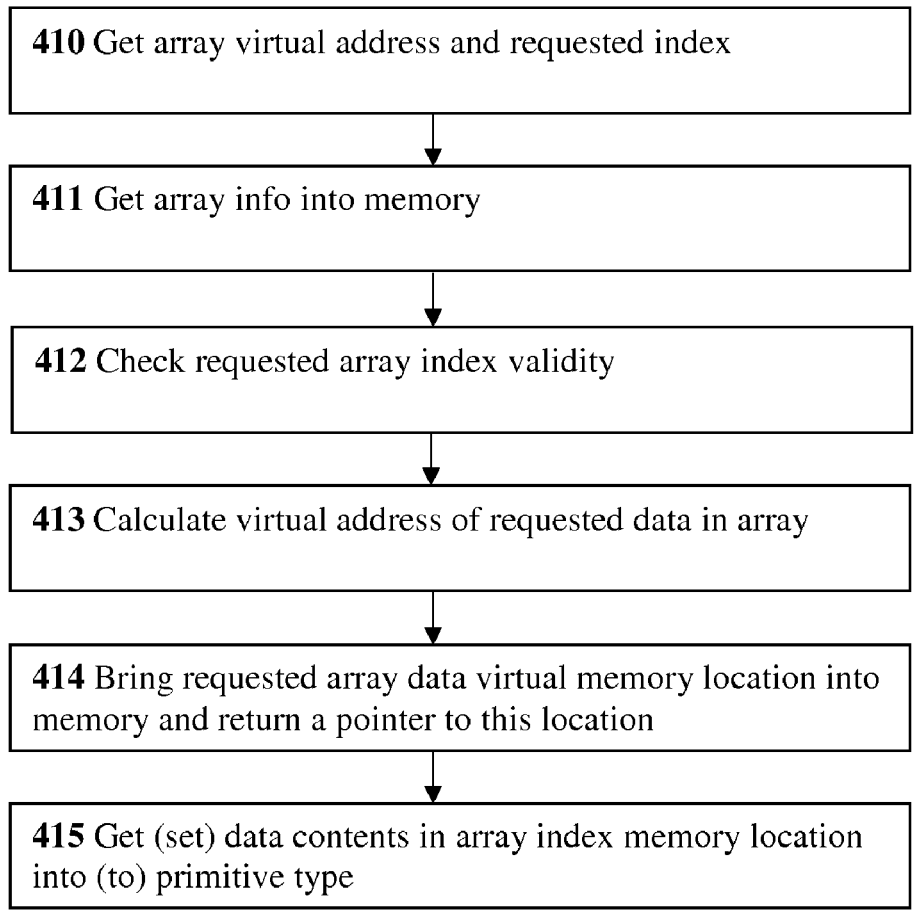
FIG. 4B is a schematic flowchart for manipulating primitive type data stored in an array in programming languages that prevent direct memory access and include virtual address mechanism, in accordance with an embodiment of the present invention.

Reference is now made to FIG. 4B, which is a schematic flowchart for manipulating primitive type data stored in an array in programming languages that prevent direct memory access and include virtual address mechanism, in accordance with an embodiment of the present invention.

In step 410 array virtual address is determined and requested data offset is received.

In step 411 array info is brought into memory (or is checked to already be in memory).

In step 412 array index is checked for validity prior to accessing data in array index. This is done in this embodiment by comparing the index to data headers of array (now in memory) which may include information regarding length or other validation data regarding array.

In step 413 virtual address of requested data in array is calculated using array start address and offset address.

In step 414 virtual memory location of requested array index is brought into memory, if not already in memory and a pointer is returned to this location in memory.

In step 415 memory contents in requested index of array, as pointed by returned pointer in step 414, is accessed either to get data from or to write data to.

This series of steps displays how the characteristics of computer languages that prevent direct access to memory may be used for implementing virtual memory mechanism internal to these computer languages. In this case an array of data is shown to be capable of being located in virtual memory. In some embodiments this may be done in conjunction to steps of FIG. 3 and memory management of FIG. 2. In this fig. an example of an array holding primitive types is shown for simplicity. In the same manner, array may hold complex structures such as objects or other arrays.

Figure 5A:
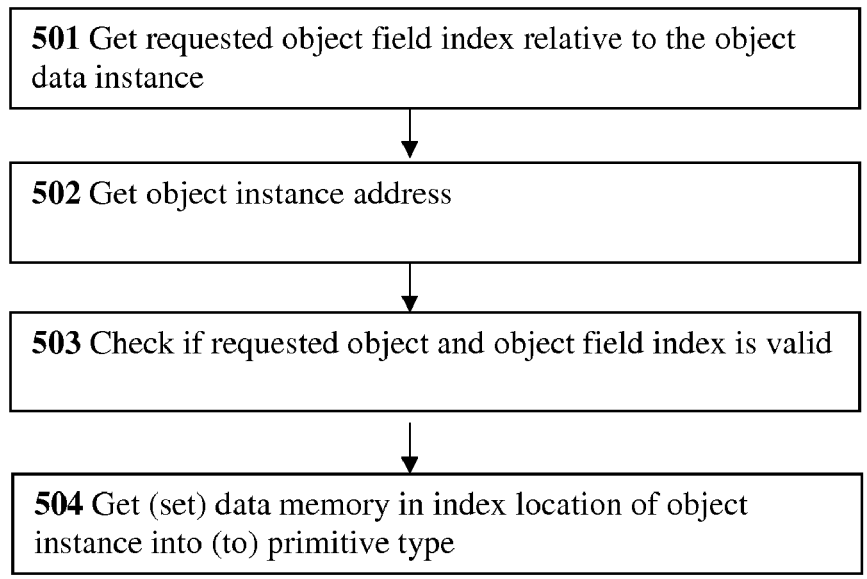
FIG. 5A is a schematic flowchart for manipulating primitive type data stored in a field of an instance object in programming languages that prevent direct memory access, in accordance with an embodiment of the present invention.

Reference is now made to FIG. 5A, which is a schematic flowchart for manipulating primitive type data stored in a field of an instance object in programming languages that prevent direct memory access, in accordance with an embodiment of the present invention.

In step 501 object field index of object instance is determined.

In step 502 object instance address is determined.

In step 503 object field in object instance is checked for validity prior to accessing data in object instance. In some embodiments this may be done by checking object instance headers at the beginning before object instance data.

In step 504 memory contents in requested field of object instance is accessed, either to get data from or to write data to.

This series of steps displays how data in an object instance is accessed in languages that do not allow direct memory access. In case where field index is an illegal value, the program will prevent going to the illegal address of that illegal field and may indicate an error.

Figure 5B:
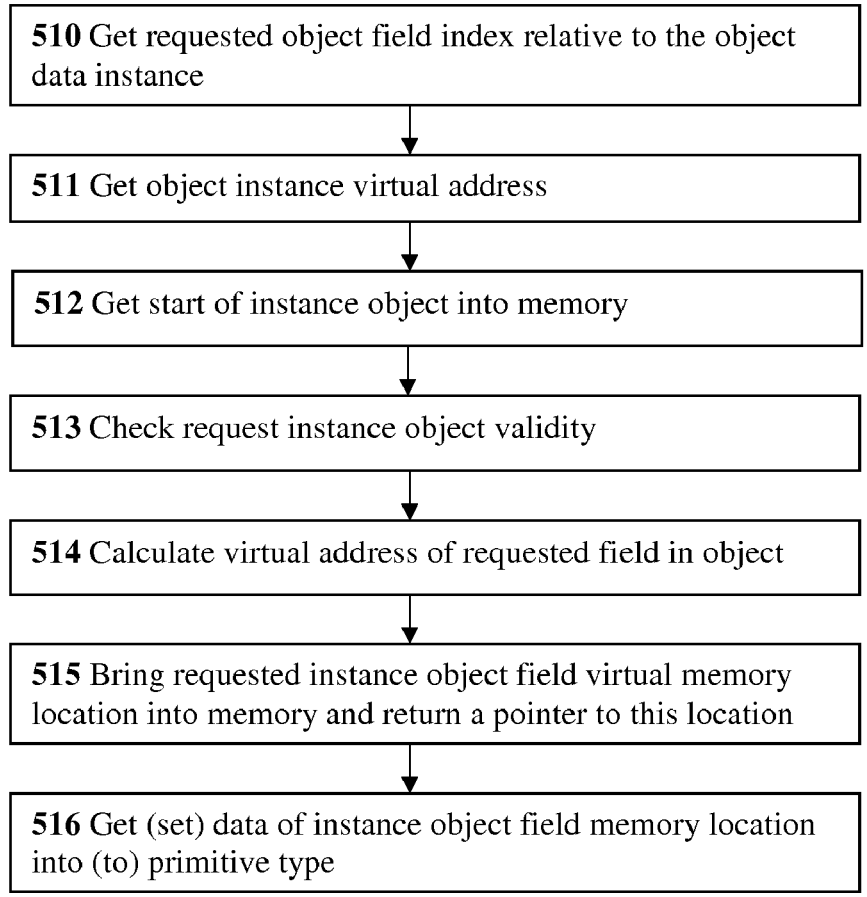
FIG. 5B is a schematic flowchart for manipulating primitive type data stored in a field of an instance object in programming languages that prevent direct memory access and include virtual address mechanism, in accordance with an embodiment of the present invention.

Reference is now made to FIG. 5B, which is a schematic flowchart for manipulating primitive type data stored in a field of an instance object in programming languages that prevent direct memory access and include virtual address mechanism, in accordance with an embodiment of the present invention.

In step 510 object field index of object instance is determined.

In step 511 object instance virtual address is determined.

In step 512 object instance info is brought into memory (or is checked to already be in memory).

In step 513 object field index is checked for validity prior to accessing data in object instance using object instance information.

In step 514 virtual address of requested field in object instance is calculated using object instance start address and object field index.

In step 515 virtual memory location of requested field in object instance is brought into memory, if not already in memory and a pointer is returned to this location in memory.

In step 516 memory contents in requested field of object instance, as pointed by returned pointer in step 515, is accessed either to get data from or to write data to.

This series of steps displays how the characteristics of computer languages that prevent direct access to memory may be used for implementing virtual memory mechanism internal to these computer languages. In this case an object instance is shown to be capable of being located in virtual memory. In some embodiments this may be done in conjunction to steps of FIG. 3 and memory management of FIG. 2. In some embodiments an object instance holds primitive types. In some embodiments object instance may hold complex structures such as objects or other arrays.

In the description herein below, the term "primitive type" refers to the basic types of a language. In Java some examples are byte, char, short, and integer. These primitive types are divided into 32 bit data entities or less, and multiples of 32 bits. For example long which is a 64 bit primitive data entry treated as two 32 bit entries.

Figure 6A:
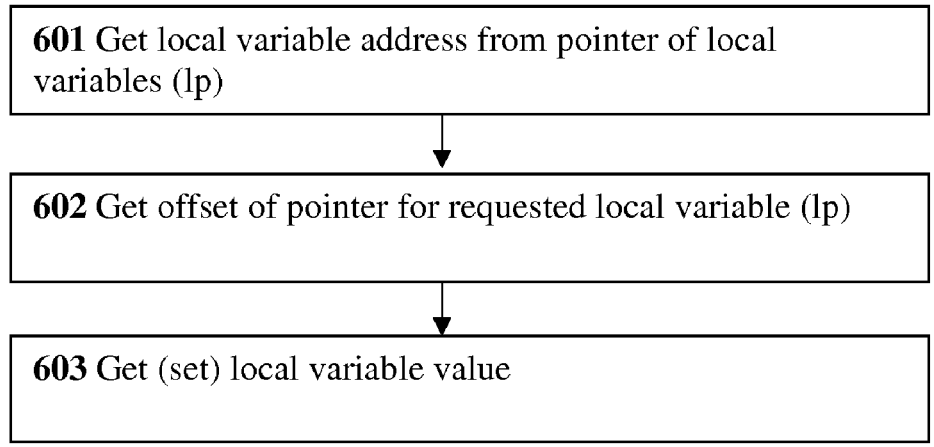
FIG. 6A is a schematic flowchart for manipulating primitive type data stored in a local variable in programming languages that prevent direct memory access, in accordance with an embodiment of the present invention.

Reference is now made to FIG. 6A, which is a schematic flowchart for manipulating primitive type data stored in a local variable in programming languages that prevent direct memory access, in accordance with an embodiment of the present invention.

In step 601 address of local variable that exists on the stack is determined from pointer of local variables. This pointer of local variables on the stack will be referred herein as 1p pointer.

In step 602 offset from 1p pointer to requested local variable is determined.

In step 603 memory contents of requested local variable is accessed, either to get data from or to write data to.

This series of steps displays how primitive local variables on the stack are addressed in languages that do not allow direct memory access.

In the description herein below, a stack frame is referred to a memory chunk that is used to grow and shrink JVM stack as necessary during runtime of JVM.

In the description herein below, the memory allocation for stack frames is made through virtual memory allocation.

Figure 6B:
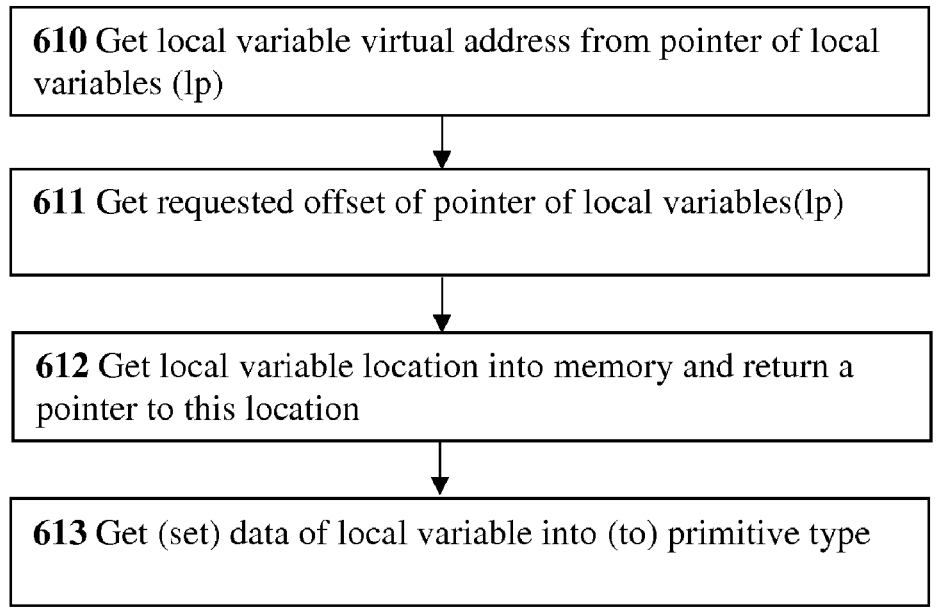
FIG. 6B is a schematic flowchart for manipulating primitive type data stored in a local variable in programming languages that prevent direct memory access and include virtual address mechanism, in accordance with an embodiment of the present invention.

Reference is now made to FIG. 6B, which is a schematic flowchart for manipulating primitive type data stored in a local variable in programming languages that prevent direct memory access and include virtual address mechanism, in accordance with an embodiment of the present invention.

In step 610 address of local variable that exists on the stack is received from pointer of local variables. This pointer of local variables on the stack will be referred herein as 1p pointer.

In step 611 offset from 1p pointer to requested local variable is determined.

In step 612 virtual memory location of requested local variable is brought into memory, if not already in memory and a pointer is returned to this location in memory.

In step 613 memory contents of requested local variable is accessed, either to get data from or to write data to.

This series of steps displays how the characteristics of computer languages that prevent direct access to memory may be used for implementing virtual memory mechanism internal to these computer languages. In this case a local variable is shown to be capable of being located in virtual memory. In some embodiments this may be done in conjunction to steps of FIG. 3 and memory management of FIG. 2. In some embodiments a local variable may hold primitive types. In some embodiments local variable may hold complex structures such as objects or other arrays.

The stack frame memory is first allocated through virtual memory allocation. Subsequent access to local variables is made in an indirect manner to local variables memory. This indirect access to local variables memory allows inserting commands to fetch requested stack frame data from virtual memory to main memory, thereby adding virtual memory features to stack frames in JVM.

FIGS. 4, 5 and 6 are examples of different data structures capable of being used in virtual memory as described. Other data types may be used as well in this manner. In these figures and such cases, if the primitive type is of multiples of 32-bit words, this series of steps may be repeated for the next 32-bit primitive word. We assume that pages are aligned to 32-bit words and that 32-bit words are not cut.

FIG. 1C, 4B, 5B, 6B present how it is possible to turn arrays of primitive types, instance objects of primitive types and stack frames to work in an internal virtual memory framework.

In some embodiments java received class code is placed in virtual memory and used by fetching required code through the instruction pointer referred to IP pointer. In this manner java code that is used or that is received from an external source, does not present a problem to the main memory size constraints and is placed in virtual memory. This may be accomplished by loading the class into allocated virtual memory for loaded class. Then verifying the class is made into stack that is in virtual memory.

In some embodiments code virtual memory is handled differently to data virtual memory because code virtual memory is read only.

In some embodiments constant poll structure is also placed in virtual memory. Constant pool is a class representation where Java bytecodes access data and methods solely via constant pool indices.

In some embodiments locking and unlocking memory fetched into RAM is necessary. For example, if a routine in the JVM requires more than one virtual memory data location to operate. To accomplish this, lock page is called. A call to unlock page is required to free page from being locked.

In some embodiments no memory is allocated directly by JVM and memory is only allocated through virtual memory allocation. Subsequent memory interfacing is made only through the methods first accessing the virtual address and then bringing the necessary data to main memory.

In some embodiments it is possible to use a hybrid RAM and virtual memory solution such that memory is used in both virtual and RAM directly. This is done by checking each entity memory address, such as arrays and instance objects. The check is made if the address falls within RAM or within virtual memory. If the address is in RAM access is made directly, otherwise RAM is fetched.

In some embodiments the minimum page size for allocation in main memory is the size of a stack frame. This may limit the maximum height of a method call.

In some embodiments KVM may be used as a virtual machine.

In some embodiments minimum consecutive allocated data in a single page includes data entity full header.

The FIG. 1C, 4B, 5B, 6B presented arrays of primitive types, instance objects of primitive types and stack frames with primitive types. In some embodiments it is possible to extend these to handle instance objects, which can recursively include instance objects until the leaf instance objects include primitive types. In some embodiments arrays of objects and multidimensional arrays are supported in a similar manner.

Figure 7:
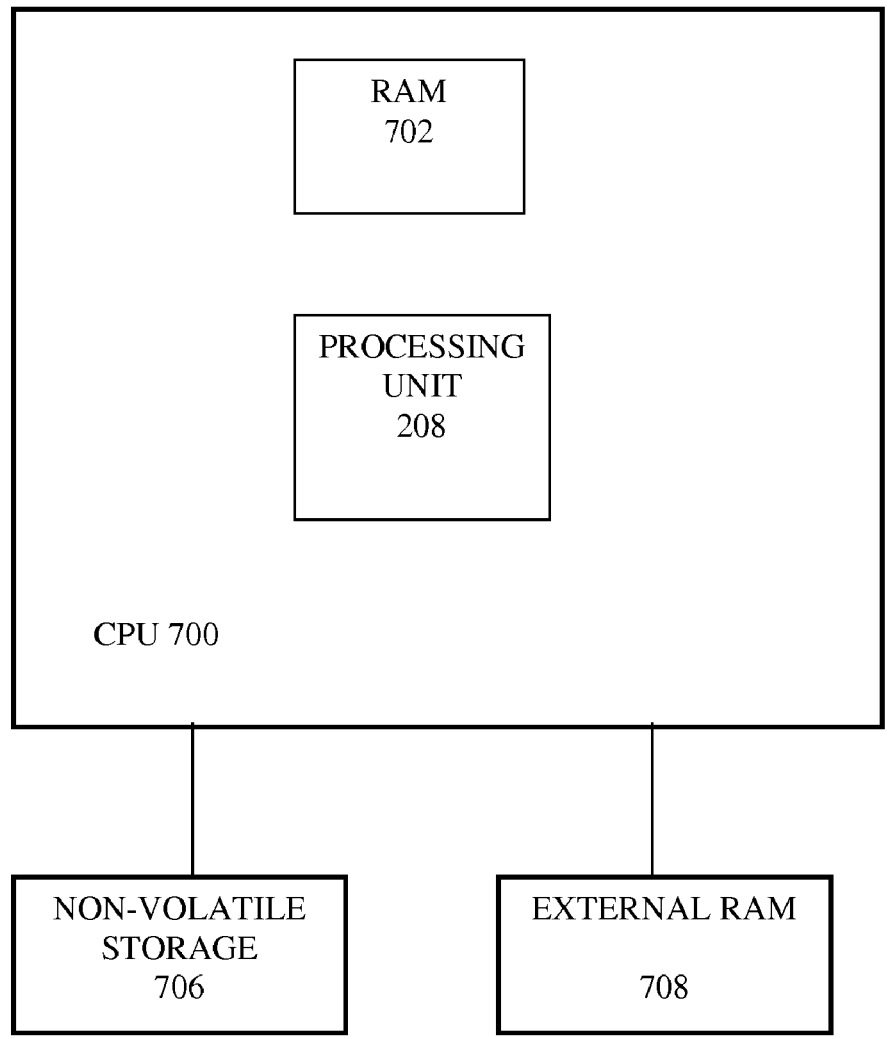
FIG. 7 is a block diagram illustration of a digital device having a processing unit, RAM and non-volatile storage, in accordance with an embodiment of the present invention.

Reference is now made to FIG. 7, which is a block diagram illustration of a digital device having a processing unit, RAM and non-volatile storage, in accordance with an embodiment of the present invention comprising CPU 700 which includes RAM 702 and processing unit 208. The block diagram further comprises non volatile storage 706 and external RAM 708 connected to CPU 700. This block diagram may be used for running a computer language such that virtual memory and/or security features are desired.

Virtual memory may be implemented by declaring RAM 702 as main memory and External RAM 708 as auxiliary memory. In other embodiments RAM 702 and external RAM 708 may be main memory and auxiliary memory is non volatile storage 706.

Virtual memory may be implemented using information in FIG. 3.

In some embodiments of block diagram of FIG. 7, RAM 702 may be memory located within memory chip, such as cache or internal memory. This memory may not be available outside CPU 700 preventing access to computations occurring within that memory by processing unit 208. In this case, it may be useful to declare RAM 702 to be main memory and use non volatile storage 706 or external ram 708 or both as auxiliary memory. If auxiliary memory is encrypted then security of executing program is achieved.

In some embodiments the code of the secure program may be protected as well. This is done by keeping program encrypted on external memory. Program code is then only decrypted in RAM 702 within CPU 700.

FIG. 7 does not display keys which may be placed within CPU 700, as well as encryption/decryption mechanisms which may exist within CPU 700.

In some embodiments CPU 700 is a SOC or System on a chip.

In some embodiments CPU 700 is may include separate RAM as well as non-volatile memory.

In some embodiment, program code is to be unalterable and kept secret. A program has a helping secret data file. It is desired that the program be executed in a safe environment and kept secret and unalterable or copied. Using the above FIGS. 1-7 it is possible to carry out such a process: Program code and data files are kept encrypted on non volatile storage 706. A required program code and data files are brought as virtual pages into RAM 702 and decrypted within CPU 700 and execute only in CPU 700. Program execution takes place as described in this disclosure using RAM 702 as main memory and external RAM 708 as auxiliary memory. In this manner program code, program data file and program memory are never exposed outside CPU 700. Secret keys may also be included within CPU 700. It is now a matter of protecting CPU 700 properly to prevent access to secret program.

In some embodiments new secret programs with or without secret data files may be received for example through the network. Such programs may arrive encrypted, may then be transposed into different encrypted format specifically relevant for CPU 700. The program may then be executed securely so that its code, data file and execution steps are all hidden externally to CPU 700, making program run securely, in an unalterable way and not being able to duplicate it.

Please note that other modules may be included in the digital device of FIG. 7 not included in the drawing for clarity.

In some embodiments digital device includes an I/O module for communicating with external entities to receive data, which may be encrypted, and/or for communicating and requesting operations from device, such as to complete a computation with a certain input.

In some embodiments the digital device may include a digital appliance such as a mobile multi-media player. The device may then connect to another digital appliance for transferring data. The disclosure may then apply to the player and digital appliance; the invention relates to any device that may be at any time attached, removed from a digital appliance or is a part of a digital appliance.

It may be appreciated by those skilled in the art of the present embodiments that the present embodiments have the following advantages over existing art:

(a) The present invention allows a programming language to offer virtual memory to programs in an independent manner.
(b) The present invention allows using environments such as J2ME and KVM on devices with very limited resources.
(c) The present invention allows protecting programs from alteration and duplication.
(d) The present invention allows to protect programs from being analyzed allowing to keep algorithms secret.
(e) The present invention allows downloading code in a secure manner and protecting its execution environment.
(f) The virtual memory mechanism and security mechanisms are transparent to the programmer.

Conclusion, Ramifications and Scope

Accordingly, the reader will see that the closure of this invention provides a method to include a virtual memory mechanism in JVM without requiring external virtual memory mechanisms such as mechanisms supported by hardware. This allows running a Java virtual machine to run on embedded devices with very small resources. Furthermore, the Java VM in these devices is implemented with minimum changes to the embedded device.

Furthermore with this invention there are additional advantages in that:

(a) The virtual machine mechanism can be used for devices using J2ME in order to conserve RAM requirements.
(b) The virtual memory mechanism for JVM can be used on a wide range of devices that were limited to inferior Java environments or had no possibility of running a Java environment.
(c) The virtual memory mechanism for JVM allows limited devices to be opened up for users to write programs to.
(d) The virtual memory mechanism for JVM allows developers to use JVM framework on device to implement a wide variety of applications that can be downloaded upon request.
(e) The mechanism for virtual memory and security are transparent to the programmer.
(f) The security mechanism allows code and execution environment to be kept within processing unit so that program content is kept secret, program is not alterable and program cannot be duplicated.

Although the description above contains many specifications, these should not be constructed as limiting the scope of the invention but as merely providing illustrations of some exemplary embodiments of this invention.

For example, a different language than Java may be used, a scripting language, an interpreted language may be used instead; A different way to implement internal virtual memory than explained in this disclosure may be used. A hybrid RAM and virtual memory approach may be used. KVM may be used.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is expected that during the life of this patent many relevant secured storage media devices and systems will be developed and the scope of the terms herein, particularly of the terms "digital device" and "internal program interpreter", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for implementing virtual memory mechanism initiated by a virtual machine configured for executing computer programs, the method comprising:
   a. said virtual machine accessing requested data for a computer program carried out by said virtual machine,
   b. said virtual machine initiating checking if said requested data is located in main memory prior to accessing said requested data for said computer program,
   c. said virtual machine initiating bringing of memory containing said requested data from auxiliary memory to said main memory following said checking of said requested data and prior to accessing said requested data for said computer program when said requested data is not in said main memory.

2. A method according to claim 1 wherein access to at least part of said main memory used for executing said program is restricted while allowing full access of said restricted memory to said virtual machine during execution of said program by said virtual machine thereby protecting at least part of said main memory used for executing said program.

3. A method according to claim 1 wherein said virtual machine initiating moving of memory from said main memory to said auxiliary memory prior to bringing of memory containing said requested data to said main memory.

4. A method according to claim 3 wherein memory moved from said main memory to said auxiliary memory is at least partly encrypted prior to being moved to said auxiliary memory during execution of said computer program whereby data in said auxiliary memory is at least partly encrypted for protecting said computer program.

5. A method according to claim 4 wherein code of said program is kept at least partially encrypted in said auxiliary memory and at least partly decrypted for use of said virtual machine during execution of said program whereby code and data of said computer program are at least partly encrypted when located in said auxiliary memory during execution of said computer program for protecting code and data of said computer program.

6. A method according to claim 5 wherein access to at least part of said main memory used for executing said program is restricted while allowing full access of said restricted memory to said virtual machine during execution of said program by said virtual machine whereby access to said program memory in said auxiliary memory is protected by said at least partly encrypted memory in said auxiliary memory and access to said program memory in said main memory is protected by said restricted memory thereby protecting data and code of said program during said program execution.

7. A system for implementing virtual memory managed by a virtual machine configured for executing computer programs the system comprising:
   a. main memory;
   b. auxiliary memory;
   c. said virtual machine configured for executing a computer program using at least part of said main memory
   d. virtual memory mechanism managed by said virtual machine for bringing data member requested by said virtual machine from said auxiliary memory to said main memory when said data member is not located in said main memory prior to accessing said data member by said virtual machine.

8. The system of claim 7 wherein said virtual memory mechanism moves memory from said main memory to said auxiliary memory prior to bringing of memory containing said data member from said auxiliary memory to said main memory.

9. The system of claim 8, further comprising encryption unit wherein memory moved from said main memory to said auxiliary memory by said virtual memory mechanism is at least partly encrypted prior to being moved to said auxiliary memory during execution of said computer program whereby data in said auxiliary memory is at least partly encrypted for protecting said computer program.

10. The system of claim 9 wherein code of said computer program is kept at least partially encrypted in said auxiliary memory and at least partly decrypted for use of said virtual machine during execution of said computer program in said main memory for protecting at least part of said code of said computer program.

11. The system of claim 9 wherein access to at least part of said main memory used for executing said program is restricted while allowing full access of said restricted memory to said virtual machine during execution of said program by said virtual machine thereby protecting at least part of said main memory used for executing said program and protecting at least part of said auxiliary memory used for executing said program.

12. The system of claim 7 wherein access to at least part of said main memory used for executing said program is restricted while allowing full access of said restricted memory to said virtual machine during execution of said program by said virtual machine for protecting at least part of said main memory used for executing said program.

13. A method for protecting a computer program executed by a virtual machine, the method comprising:
   a. executing said computer program by said virtual machine said virtual machine using at least part of main memory for executing said program,
   b. said virtual machine managing placing portion of memory used for executing said program into auxiliary memory when additional memory is required in said main memory during execution of said program by said virtual machine,
   c. encrypting at least part of said portion of memory placed in said auxiliary memory before said portion of memory is placed in said auxiliary memory during execution of said program for protecting at least part of said auxiliary memory used for executing said program.

14. A method according to claim 13 wherein code of said computer program is kept at least partially encrypted in said auxiliary memory and at least partly decrypted for use of said virtual machine during execution of said computer program for protecting at least part of said code of said computer program.

15. The method of claim 13 wherein access to at least part of said main memory used for executing said program is restricted while allowing full access of said restricted memory to said virtual machine during execution of said program by said virtual machine thereby protecting at least part of said main memory used for executing said program and protecting at least part of said auxiliary memory used for executing said program.

16. A method according to claim 13 wherein said virtual machine managing bringing data requested by said virtual machine from said auxiliary memory to said main memory during execution of said program when said requested data is not located in said main memory.

17. A system for protecting a computer program executed by a virtual machine the system comprising:
   a. main memory;
   b. auxiliary memory;
   c. said virtual machine configured for executing a computer program in at least part of said main memory;
   d. virtual memory mechanism for placing portion of memory used for executing said program from said main memory to said auxiliary memory when additional memory is required in said main memory during execution of said program by said virtual machine,
   e. an encryption unit for encrypting at least part of said portion of memory before said portion of memory is placed in said auxiliary memory during execution of said program whereby at least part of said portion of memory located in said auxiliary memory is encrypted during execution of said program thereby protecting at least part of memory located in said auxiliary memory used by said virtual machine for executing said program.

18. The system of claim 17 wherein said virtual memory mechanism is managed by said virtual machine for bringing data requested by said virtual machine from said auxiliary memory to said main memory during execution of said program when said requested data is not located in said main memory.

19. The system of claim 17 wherein code of said program is kept at least partially encrypted in said auxiliary memory and at least partly decrypted for use of said virtual machine during execution of said program for protecting at least part of said code of said program, 20. The system of claim 17 wherein access to at least part of said main memory used for executing said program is restricted while allowing full access of said restricted memory to said virtual machine during execution of said program by said virtual machine for protecting at least part of said main memory used for executing said program.

* * * * *